(12) United States Patent
Li

(10) Patent No.: US 11,825,580 B2
(45) Date of Patent: Nov. 21, 2023

(54) OPTICAL PEST REPELLER

(71) Applicant: Kuan-Yu Li, Kaohsiung (TW)

(72) Inventor: Kuan-Yu Li, Kaohsiung (TW)

( * ) Notice: Subject to any disclaimer, the term of this patent is extended or adjusted under 35 U.S.C. 154(b) by 203 days.

(21) Appl. No.: 17/451,928

(22) Filed: Oct. 22, 2021

(65) Prior Publication Data
US 2022/0132638 A1 Apr. 28, 2022

(30) Foreign Application Priority Data

Oct. 28, 2020 (TW) ................................ 109214158

(51) Int. Cl.
*H05B 47/115* (2020.01)
*F21V 25/00* (2006.01)
*A01M 1/22* (2006.01)

(52) U.S. Cl.
CPC .......... *H05B 47/115* (2020.01); *A01M 1/226* (2013.01); *F21V 25/00* (2013.01); *A01M 2200/012* (2013.01)

(58) Field of Classification Search
CPC .... H05B 47/115; H05B 47/155; H05B 47/13; H05B 47/105; H05B 47/10; A01M 1/226; A01M 2200/012; F21V 25/00; F21V 23/0442; F21V 23/0471; F21V 33/00; F21V 33/006; F21V 99/00; Y02A 50/30; Y02B 20/40; F21Y 2113/00
See application file for complete search history.

(56) References Cited

U.S. PATENT DOCUMENTS

| | | | |
|---|---|---|---|
| 5,257,012 A * | 10/1993 | Metcalf | G08B 3/10 340/573.2 |
| 2013/0077446 A1 * | 3/2013 | Kasper | A01M 29/18 367/139 |
| 2017/0219235 A1 * | 8/2017 | Connell | A01M 29/24 |
| 2017/0290318 A1 * | 10/2017 | Bergengren | A01M 1/08 |

* cited by examiner

*Primary Examiner* — Bao Q Truong
(74) *Attorney, Agent, or Firm* — Rosenberg, Klein & Lee

(57) ABSTRACT

An optical pest repeller includes at least two first light sources, at least two first photosensitive members, at least one second light source, and a processing unit. The second light source is located between the first photosensitive members in a second direction. By comparing a light-shading area with a threshold value, no matter which side of the second direction a human body enters by mistake, the second light source can be turned off in time. The safety of use of the optical pest repeller is improved greatly.

10 Claims, 22 Drawing Sheets

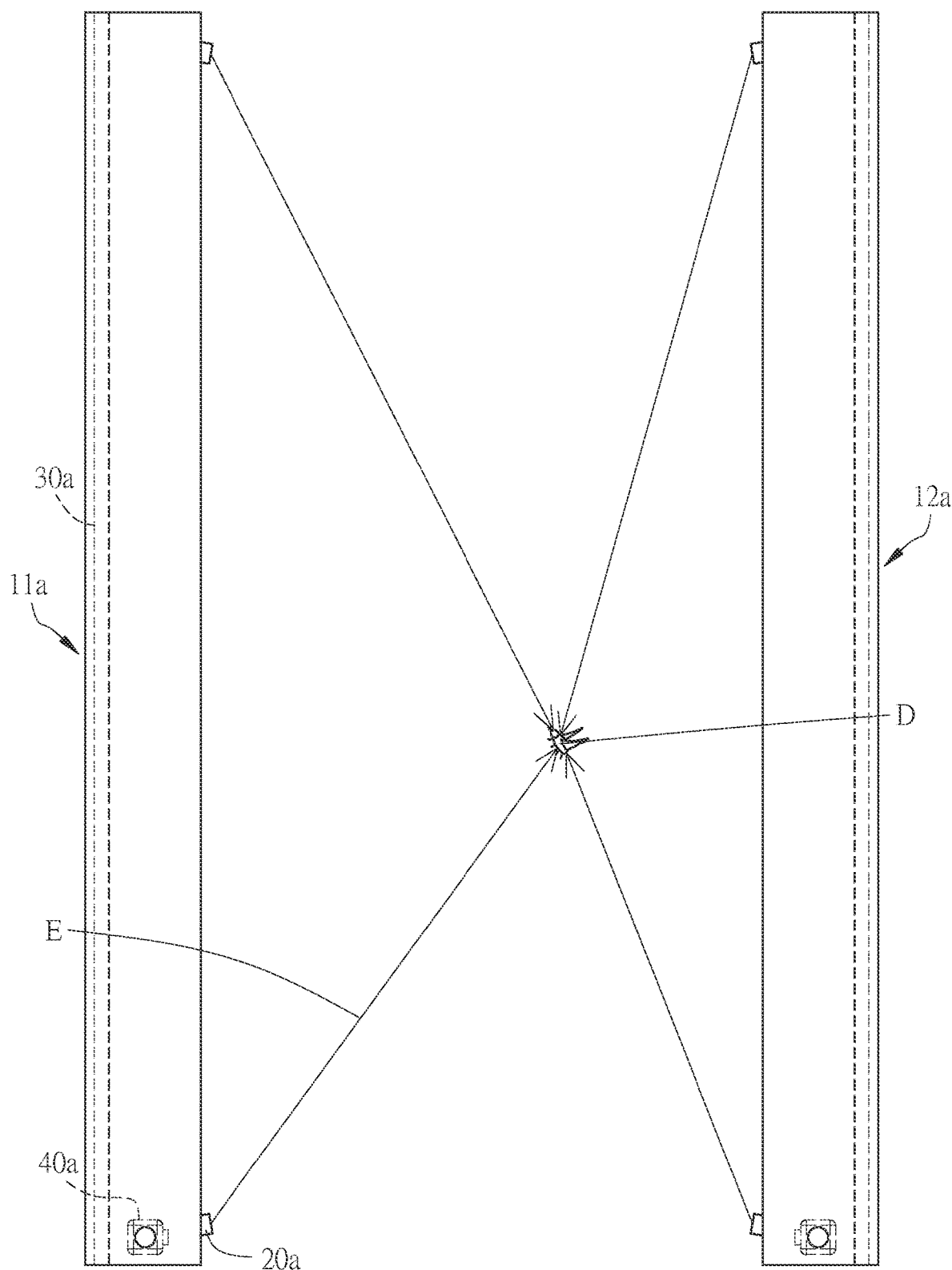
F I G . 12

OPTICAL PEST REPELLER

FIELD OF THE INVENTION

The present invention relates to an optical pest repeller.

BACKGROUND OF THE INVENTION

In order to avoid the infestation of mosquitoes, there are many ways to repel insects, such as mosquito coils, mosquito traps, mosquito swatters, mosquito nets, mosquito repellents, and so on. However, the aforementioned ways to repel insects are ineffective.

There are some related patented technologies that assist in the identification and elimination of mosquitoes by optical means. For example, Chinese Patent Publication No. CN 107743936 A discloses a laser mosquito defense system. The system provides a dense infrared scanner optical net and a dense laser net formed by two or three reflectors to detect and kill mosquitoes. Taiwan Patent Publication No. 202022698 A discloses a system and method for locating and repelling insects. It detects the location of mosquitoes by obtaining images of enclosed spaces and further kill mosquitoes.

Taiwan Patent Publication No. M609837 discloses an optical pest-repelling device, which was filed in the name of the inventor of the present invention. The device provides photosensitive members to detect the light-shading area, and then the position of the mosquito can be further calculated for killing.

However, the inventor continues to study and find that the safety measures when a human body enters by mistake are still relatively inadequate. If the high-power light source used to kill mosquitoes is turned on, the human body may be burned by the high-power light source. The low-power light source used for detection has not yet been actuated, which is especially dangerous for families with children.

SUMMARY OF THE INVENTION

According to one aspect of the present invention, an optical pest repeller is provided, comprising at least two first light sources, at least two first photosensitive members, at least one second light source, and a processing unit. The first light sources jointly define a sensing range between a first direction and a second direction. The first light sources are separated by a distance in the second direction. The first light sources each emit a first light ray toward the sensing range. An energy density of the first light ray is not greater than a human body tolerance valve. The first photosensitive members are disposed opposite to the first light sources and correspond to the sensing range. The second light source is located between the first photosensitive members in the second direction. The second light source emits a second light ray. An energy density of the second light ray is greater than the human body tolerance valve. The processing unit is in signal communication with the first light sources, the first photosensitive members and the second light source. When the first light ray emitted by the first light sources is blocked in a light-shading region in the sensing range, the processing unit obtains a position corresponding to the light-shading region and a light-shading area according to light-sensing conditions of the first photosensitive members. When the light-shading area is less than a threshold value, the processing unit controls the second light source to emit the second light ray corresponding to the light-shading region according to the position of the light-shading region. When the light-shading area is not less than the threshold value, the processing unit controls the second light source to stop emitting the second light ray.

According to another aspect of the present invention, an optical pest repeller is provided, comprising a first body, a second body, at least two first light sources, at least two first photosensitive members, at least one second light source, and a processing unit. The first body extends along a first direction and a second direction. An included angle is defined between the first direction and the second direction. The second body is spaced apart from the first body. The first body and the second body jointly define a sensing range between the first direction and the second direction. The first light sources are disposed on the first body and/or the second body. The first light sources are separated by a distance in the second direction. The first light sources each emit a first light ray toward the sensing range. An energy density of the first light ray is not greater than a human body tolerance valve. The first photosensitive members are disposed on the first body and/or the second body. The first photosensitive members are opposite to the first light sources and correspond to the sensing range. The second light source is disposed on the first body and/or the second body. The second light source is located between the first photosensitive members in the second direction. The second light source emits a second light ray. An energy density of the second light ray is greater than the human body tolerance valve. The processing unit is in signal communication with the first light sources, the first photosensitive members and the second light source. When the first light ray emitted by the first light sources is blocked in a light-shading region in the sensing range, the processing unit obtains a position corresponding to the light-shading region and a light-shading area according to light-sensing conditions of the first photosensitive members. When the light-shading area is less than a threshold value, the processing unit controls the second light source to emit the second light ray corresponding to the light-shading region according to the position of the light-shading region. When the light-shading area is not less than the threshold value, the processing unit controls the second light source to stop emitting the second light ray.

According to the above technical features, the following effects can be achieved:

Even if the second light source is eliminating the pest, no matter from which side the human body enters the sensing range, before the human body is illuminated by the second light ray, the second light source is turned off in time. The safety of use of the optical pest repeller is improved greatly.

BRIEF DESCRIPTION OF THE DRAWINGS

FIG. 12 is a third schematic view of the implementation of the second embodiment of the present invention, illustrating that multiple first light sources jointly detect the pest;

DESCRIPTION OF THE PREFERRED EMBODIMENTS

Embodiments of the present invention will now be described, by way of example only, with reference to the accompanying drawings.

Figure 1:
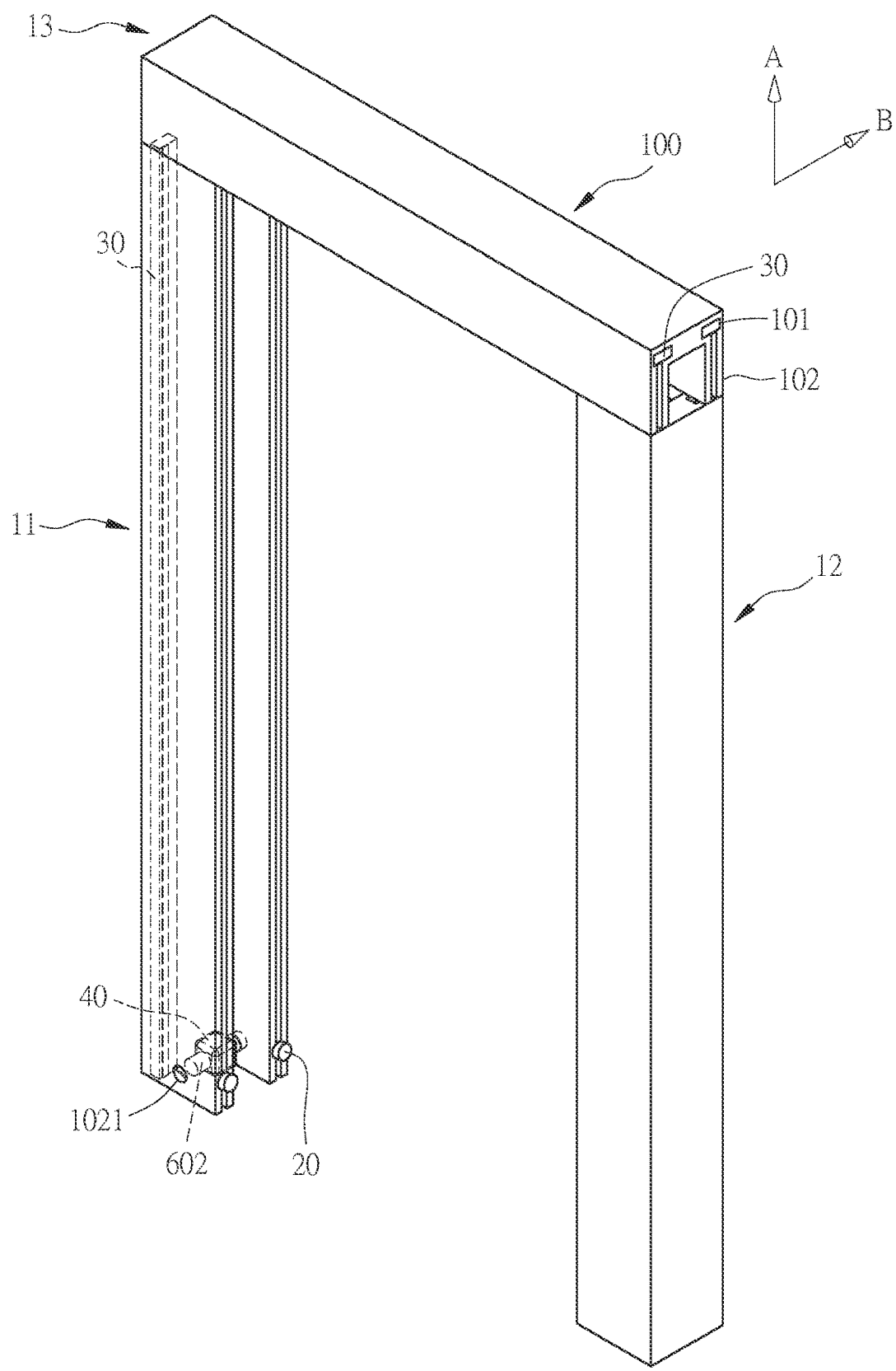
FIG. 1 is a perspective view according to a first embodiment of the present invention.
Figure 2:
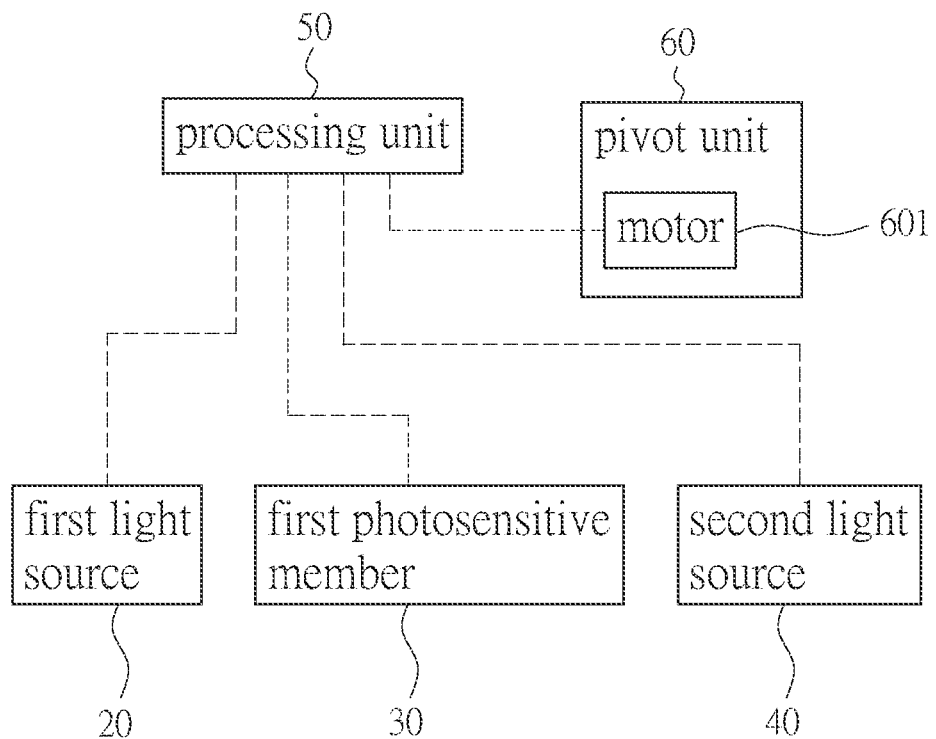
FIG. 2 is a block diagram of the first embodiment of the present invention.

As shown in FIG. 1 and FIG. 2, an optical pest repeller 100 according to a first embodiment of the present invention comprises a first body 11, a second body 12, a third body 13, two first light sources 20, a plurality of first photosensitive members 30, a second light source 40, a processing unit 50, and a pivot unit 60.

Figure 3:
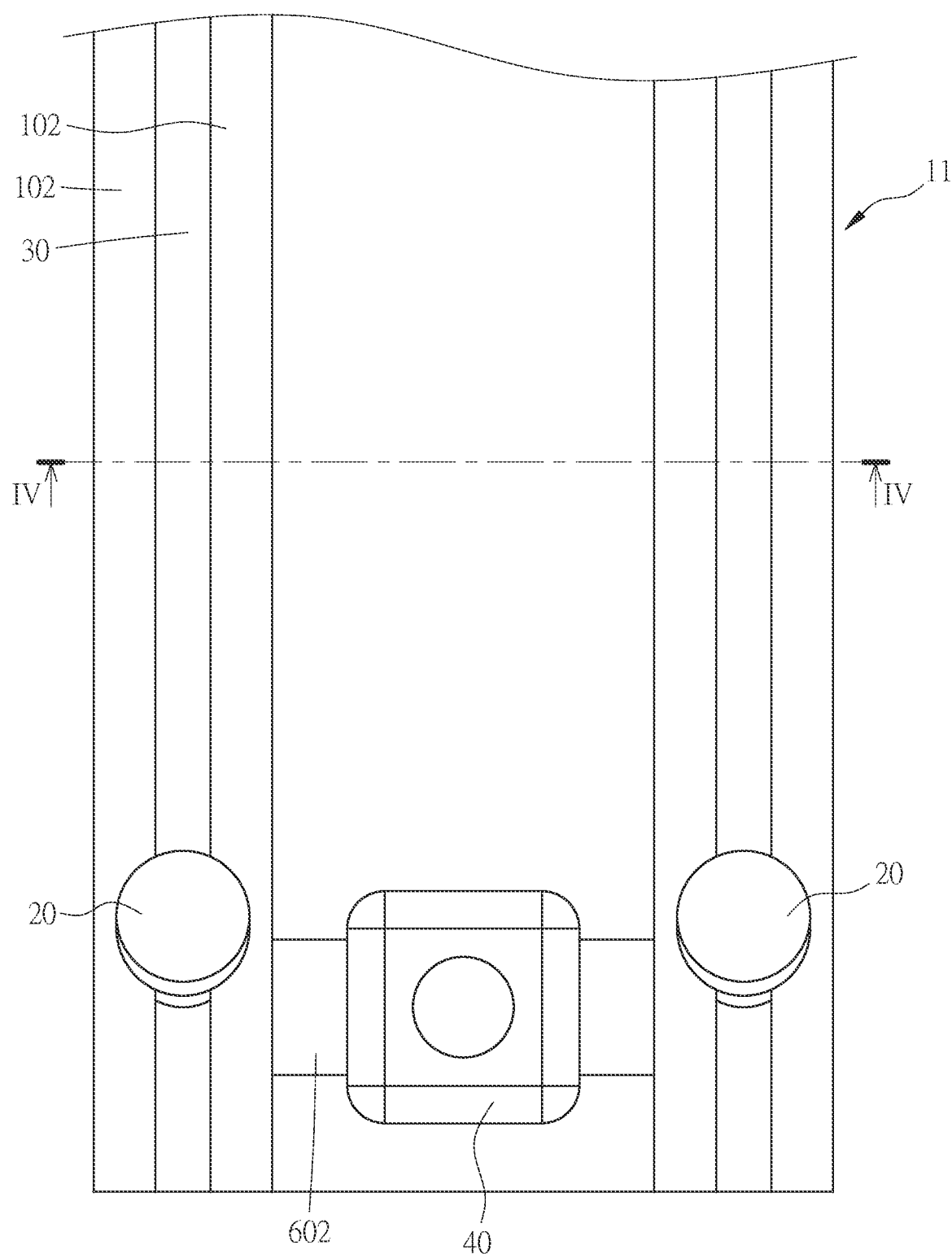
FIG. 3 is aside view of the first body of the first embodiment of the present invention.
Figure 4:
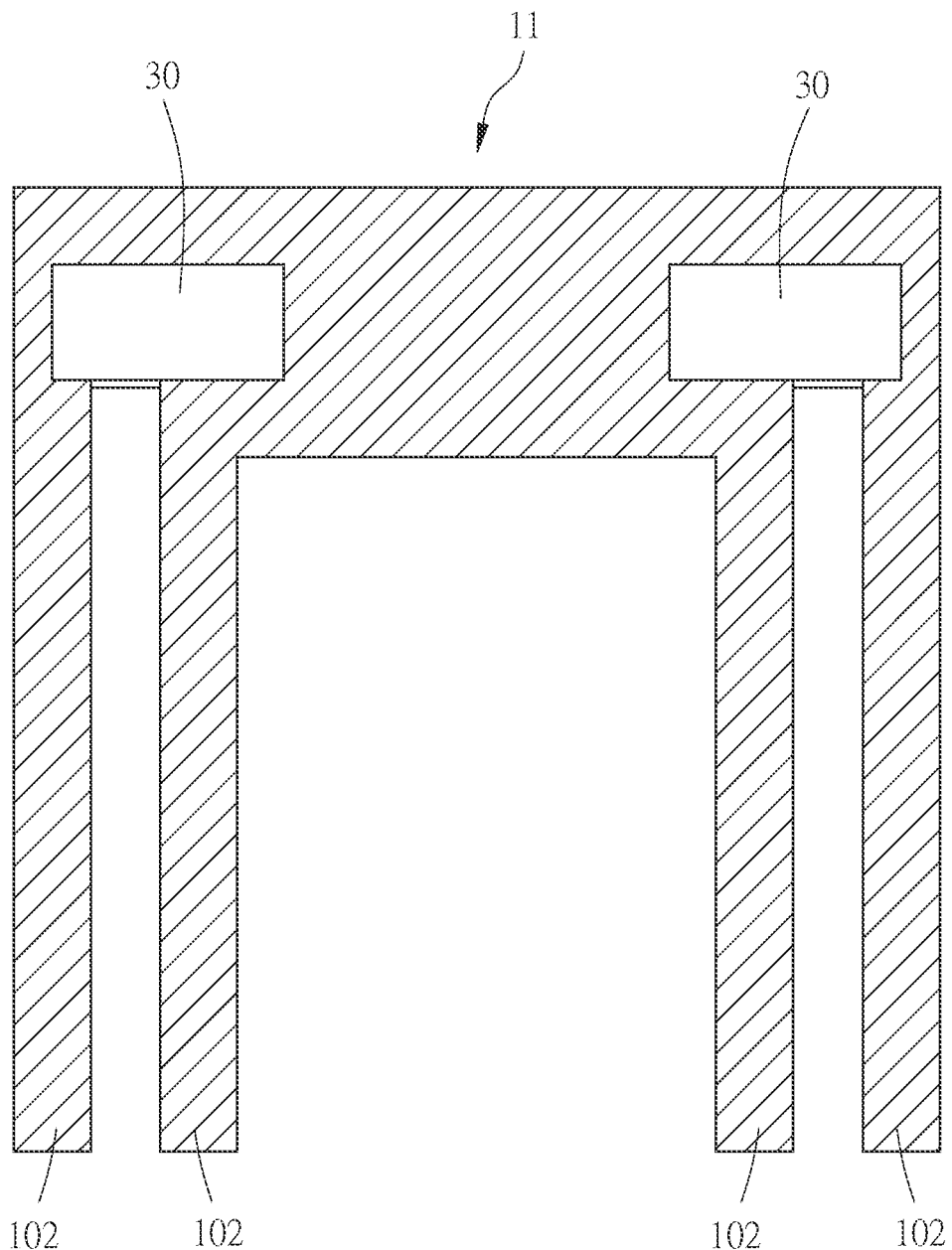
FIG. 4 is a cross-sectional view of FIG. 3, illustrating that the first photosensitive members are dispose on the first body.

Referring to FIG. 1, FIG. 3 and FIG. 4, the first body 11 and the second body 12 each extend along a first direction A and a second direction B. The third body 13 spans the first body 11 and the second body 12 and is connected on top of the first body 11 and the second body 12. An included angle is defined between the first direction A and the second direction B. The first body 11 and the second body 12 are spaced apart from each other. The first body 11, the second body 12 and the third body 13 jointly define a sensing range between the first direction A and the second direction B. In this embodiment, the first direction A is perpendicular to the second direction B. The first body 11, the second body 12 and the third body 13 may be not needed, and the other components of the optical pest repeller 100 are directly installed on an existing door frame (not shown), which is convenient for implementation. Both ends of the first body 11, the second body 12 and the third body 13 in the second direction B are each provided with a groove 101. Two baffles 102 adjacent to each other are provided on either side of the groove 101. The baffles 102 are formed with a plurality of pivot holes 1021. In the figures of this embodiment, only the pivot holes 1021 are illustrated on the first body 11, and the actual implementation is not limited to this.

The first light sources 20 are disposed on the baffles 102 of the first body 11, or may be disposed on the sides of the first body 11, and are separated by a distance in the second direction B. The first light sources 20 each emit a first light ray E toward the sensing range. (As to the first light ray E, please refer to FIG. 5.) The energy density of the first light ray E is not greater than a human body tolerance valve. The first light ray E may be, for example, infrared light. The human body tolerance value may be set to a value that does not cause injury or disease to a human body C as shown in FIG. 6, for example.

The first photosensitive members 30 are disposed in the groove 101 and opposite to the first light sources 20 to correspond to the sensing range. The first photosensitive members 30 may include a photoresistor and a circuit board. The circuit board is received in the groove 101. The photoresistor extends between the baffles 102. In addition to avoiding interference caused by ambient light sources, the first photosensitive members 30 are confined by the baffles 102 and the groove 101 and face the first light sources 20.

Figure 8:
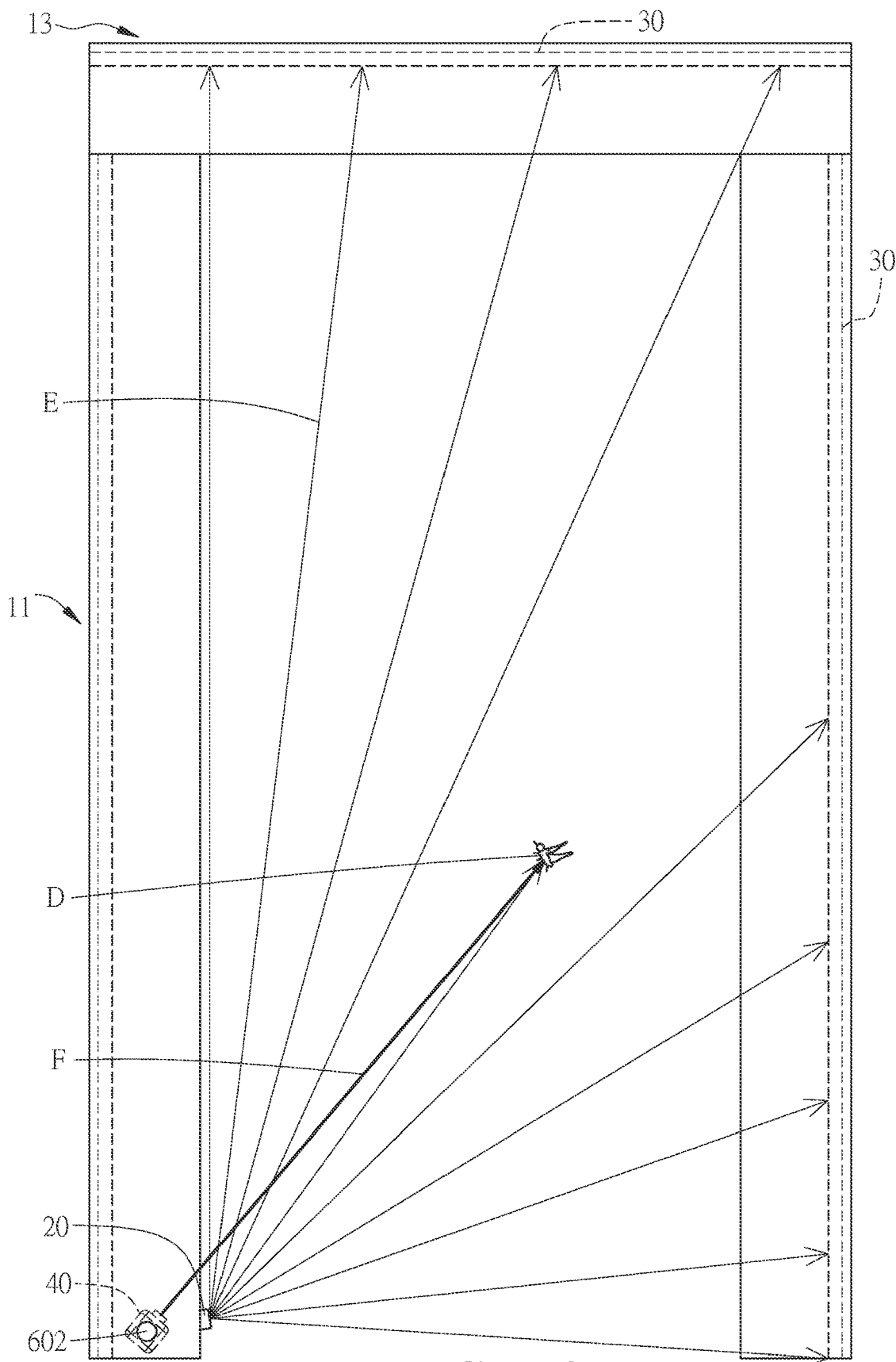
FIG. 8 is a fourth schematic view of the implementation of the first embodiment of the present invention, illustrating that the second light source is activated to eliminate the pest.

The second light source 40 is disposed on the first body 11 and located between the first photosensitive members 30 in the second direction B. The second light source 40 emits a second light ray F. (As to the second light ray F, please refer to FIG. 8.) The energy density of the second light ray F is greater than the human body tolerance valve.

Referring to FIGS. 1 to 3, the pivot unit 60 includes a motor 601 and a rotating shaft 602. The motor 601 may be a stepping motor or a servo motor. The motor 601 and the second light source 40 are coupled to the rotating shaft 602. The rotating shaft 602 may be pivotally coupled to the pivot holes 1021 of the first body 11, in cooperation with a bearing to facilitate pivoting in implementation. The rotating shaft 602 may be not needed, and the second light source 40 is directly locked to the motor 601.

The processing unit 50 is in signal communication with the first light sources 20, the first photosensitive members 30, the second light source 40 and the motor 601 of the pivot unit 60.

Figure 5:
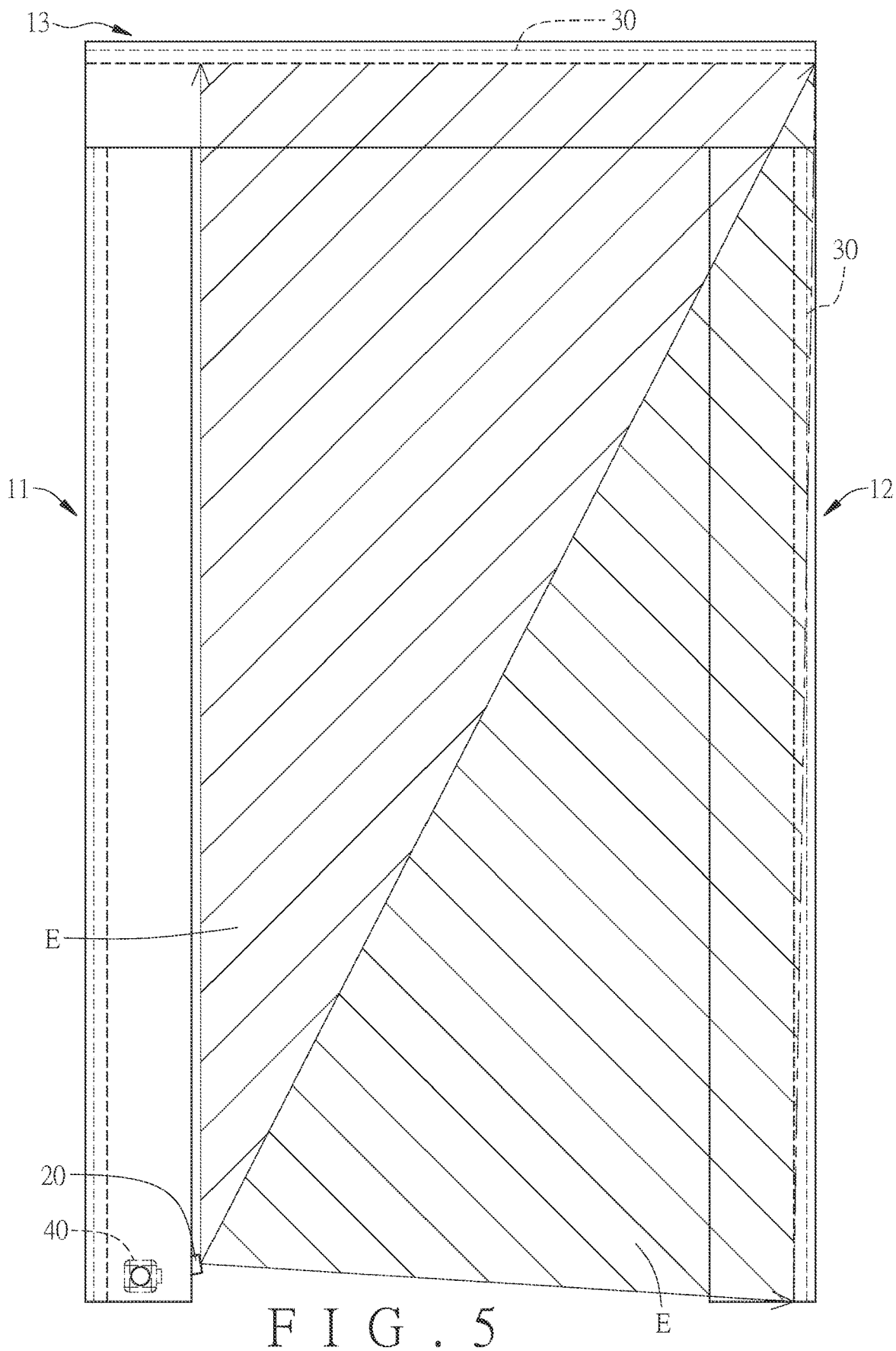
FIG. 5 is a first schematic view of the implementation of the first embodiment of the present invention, illustrating that the first photosensitive members on the second body and the third body receive the first light ray emitted by the same first light source.
Figure 6:
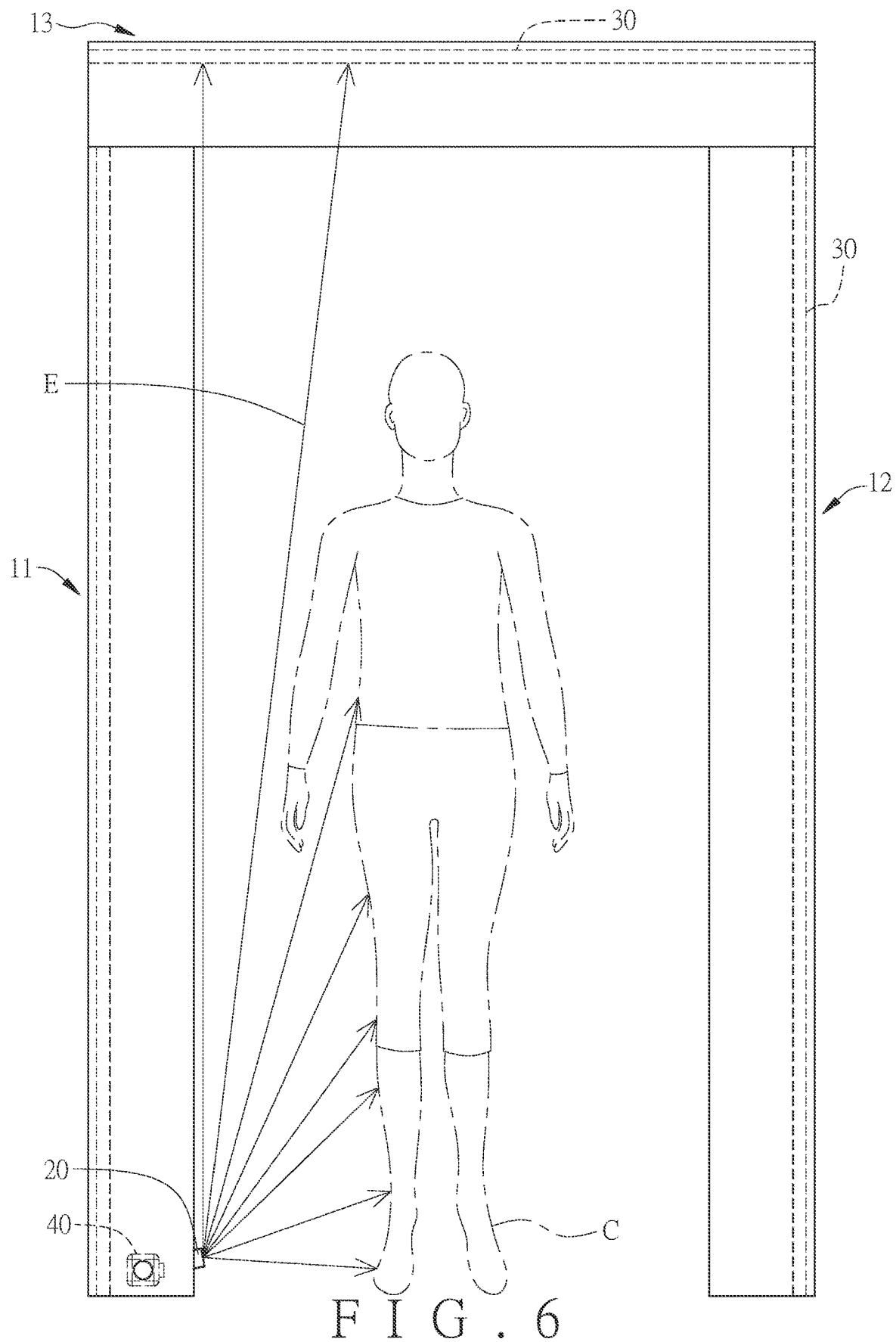
FIG. 6 is a second schematic view of the implementation of the first embodiment of the present invention, illustrating that a human body blocks most of the first light ray.
Figure 7:
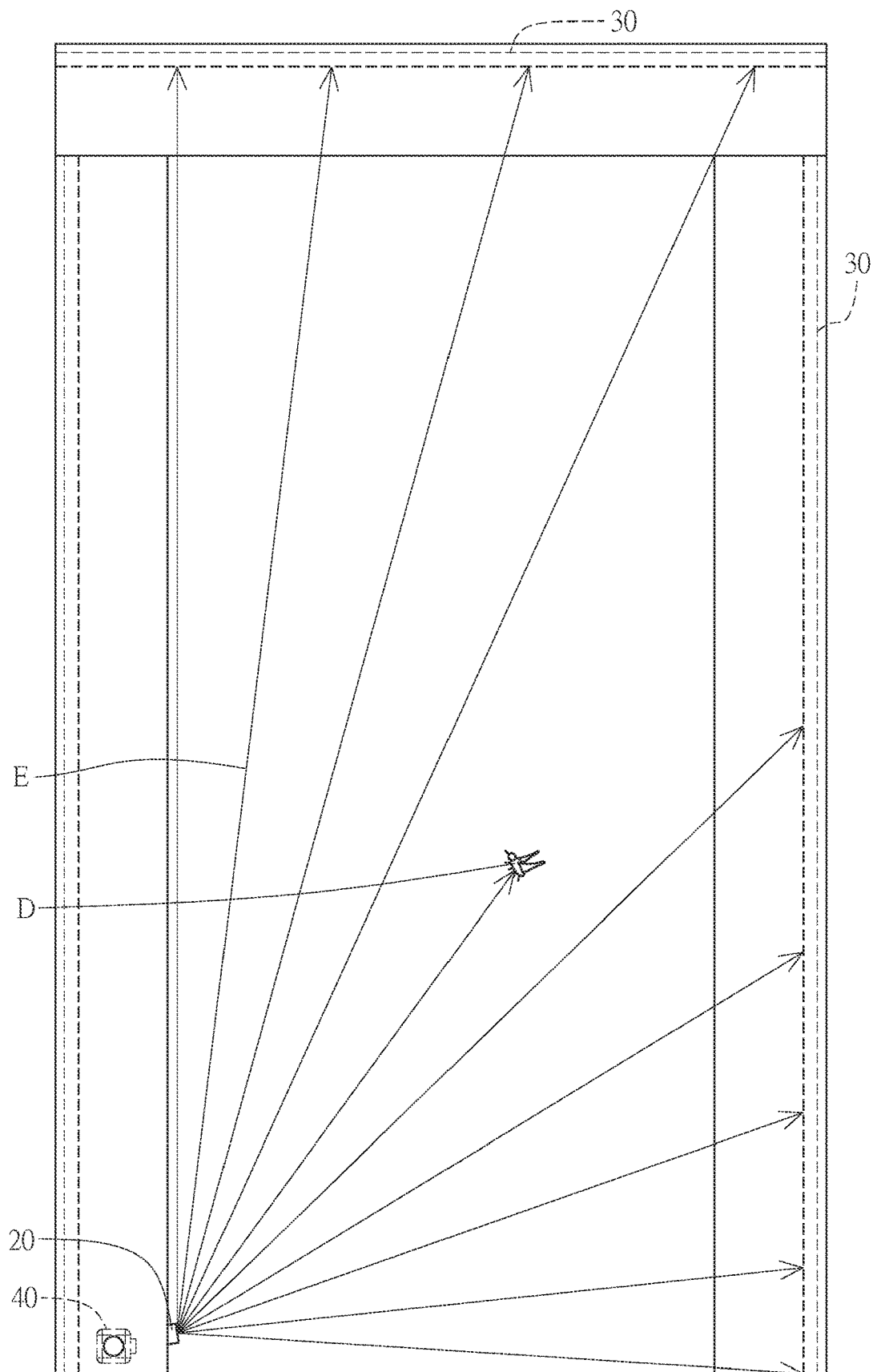
FIG. 7 is a third schematic view of the implementation of the first embodiment of the present invention, illustrating that a pest blocks a small part of the first light ray.

Please refer to FIG. 5. In this embodiment, the first light sources 20 are planar light sources, and the second light source 40 is a point light source. The first light sources 20 with different divergence angles may be selected to correspond to the first photosensitive members 30. The first light ray E in the upper half of the sensing range is detected by the first photosensitive members 30 of the third body 13. The first light ray E in the lower half of the sensing range is detected by the first photosensitive members 30 of the second body 12.

Please refer to FIGS. 6-8 and FIG. 2. Through the first light ray E emitted from the first light source 20, when the first light ray E is blocked in a light-shading region in the sensing range, the processing unit 50 obtains the position corresponding to the light-shading region and a light-shading area according to the light-sensing conditions of the first photosensitive members 30. A threshold value may be set in the processing unit 50 in advance, for example, 3 to 5 millimeters and so on.

When the first light ray E is blocked by the human body C, the processing unit 50 controls the second light source 40 not to emit the second light ray F because the light-shading area is not less than the threshold value.

When the first light ray E is blocked by a pest D, since the light-shading area is less than the threshold value, the processing unit 50 controls the pivot unit 60 to drive the second light source 40 to pivot relative to the first body 11 according to the position of the light-shading region and to emit the second light ray F after corresponding to the light-shading region. The pest D is eliminated by the second light ray F, such as burning the pest D.

In this embodiment, the second light source 40 and the first light sources 20 are arranged on the same rotation axis. Therefore, the processing unit 50 can directly convert the inclination angle of the first light source 20 and the first photosensitive member 30 that does not receive the first light ray E into the degree of rotation of the second light source 40. In the figures, only a few beams of the first light ray E are illustrated to indicate that the first light ray E is blocked. In implementation, the first light sources 20 may be moved toward the first photosensitive members 30, so that the first light ray E and the second light ray F are emitted at the same position to reduce errors, but it is not shown in the figures.

Figure 9:
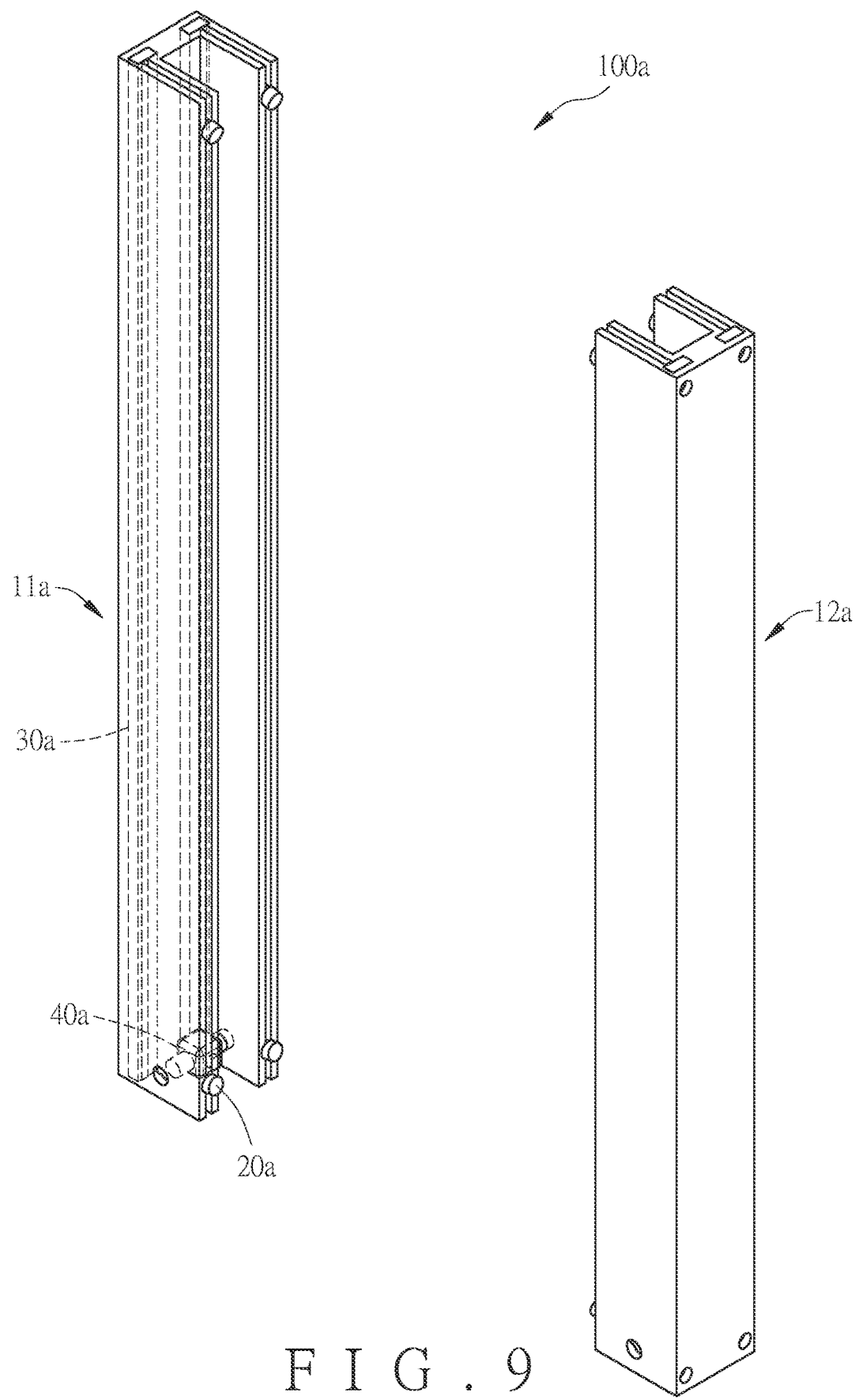
FIG. 9 is a perspective view according to a second embodiment of the present invention.
Figure 10:
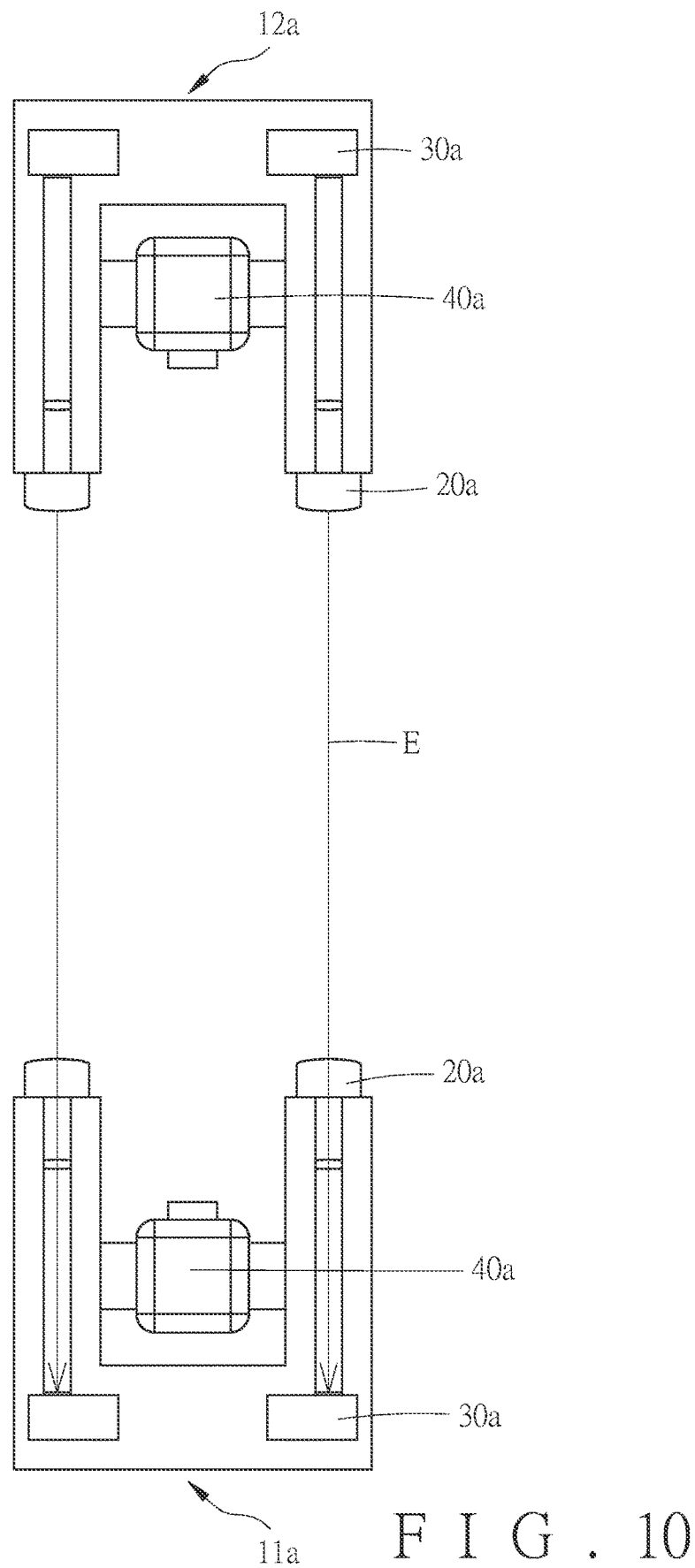
FIG. 10 is a first schematic view of the implementation of the second embodiment of the present invention, illustrating that the first body faces the second body.

FIG. 9 and FIG. 10 illustrate a second embodiment of the optical pest repeller 100a of the present invention. The difference between the second embodiment and the first embodiment is that the first embodiment (referring to FIG. 1) is provided with the third body 13; the second embodiment is not provided with the third body.

Figure 11:
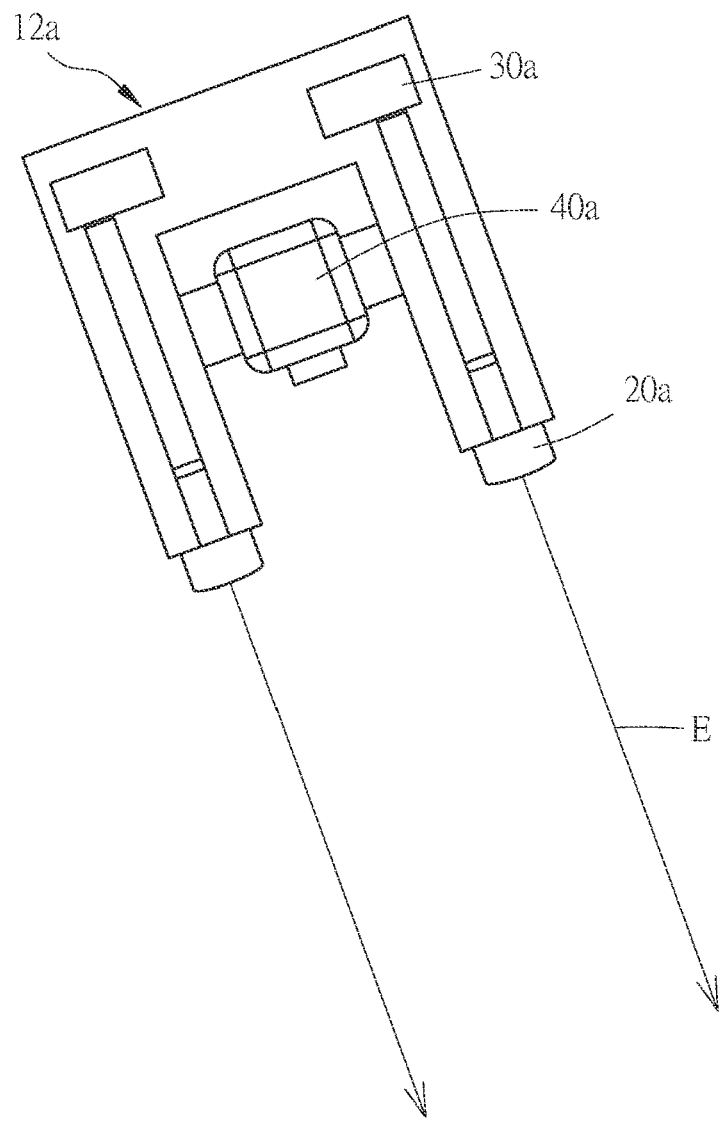
FIG. 11 is a second schematic view of the implementation of the second embodiment of the present invention, illustrating that the second body is skewed relative to the first body.
Figure 11:
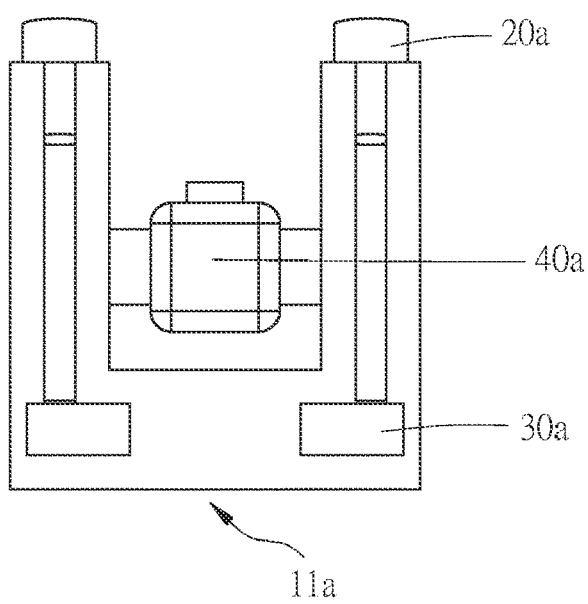

Referring to FIG. 10 and FIG. 11, since only the first body 11a and the second body 12a are provided, when one of them is bumped or skewed for some reasons, the first body 11a and the second body 12a don't face each other. Because the first photosensitive members 30a do not receive the first light ray E emitted by the first light sources 20a, that is, the light-shading area is significantly greater than the threshold value, the second light source 40a is not actuated to avoid a danger caused by the second light ray F. (As to the second light ray F, please refer to FIG. 13.)

Figure 13:
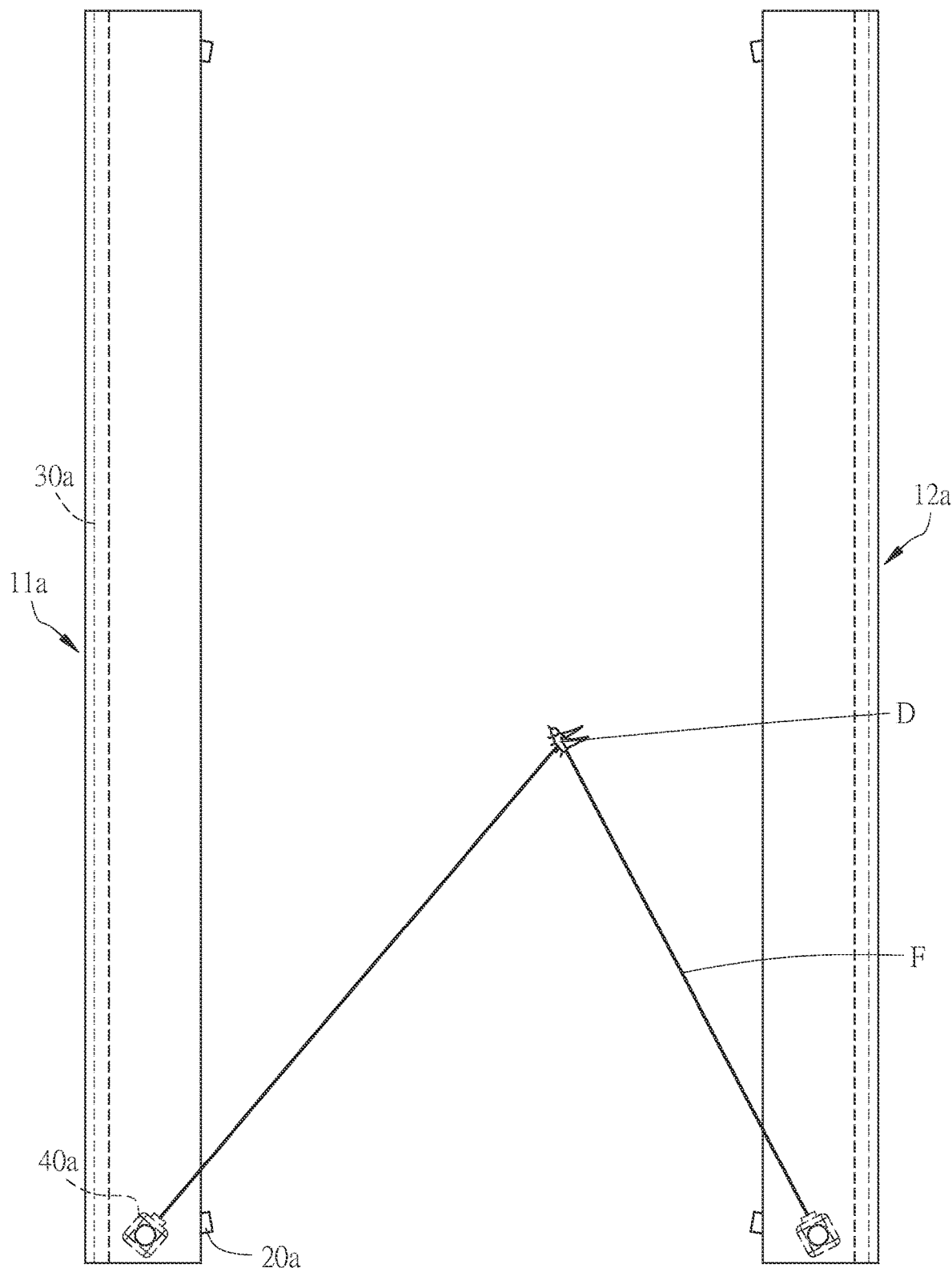
FIG. 13 is a fourth schematic view of the implementation of the second embodiment of the present invention, illustrating that the second light source is activated to eliminate the pest.

Referring to FIG. 12 and FIG. 13, the operation of the second embodiment is the same as that of the first embodiment. The first light sources 20a emit the first light ray E to detect the pest D, and the second light source 40a emits the second light ray F to eliminate the pest D. This will not be repeated.

Figure 14:
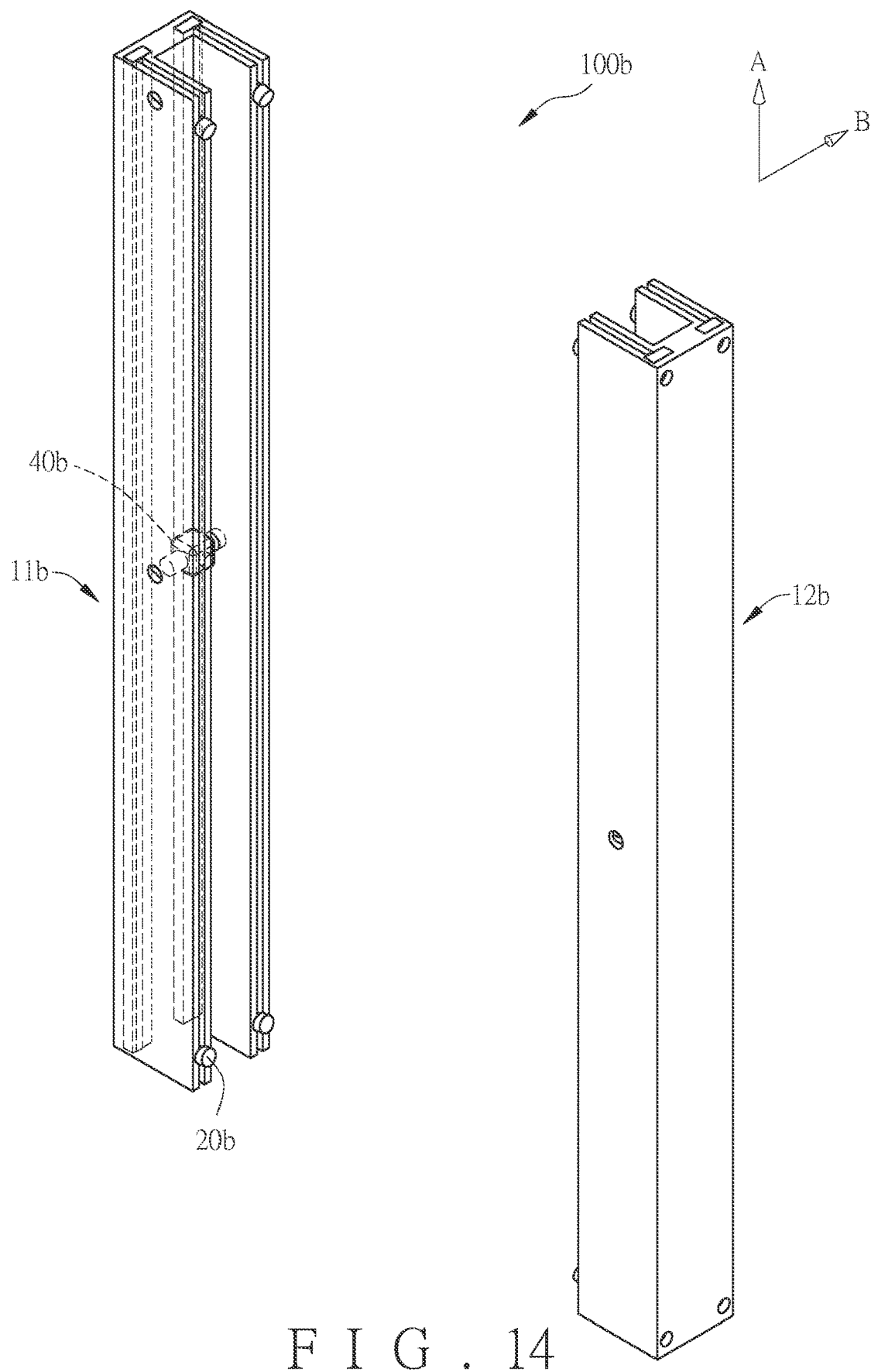
FIG. 14 is a perspective view according to a third embodiment of the present invention.
Figure 15:
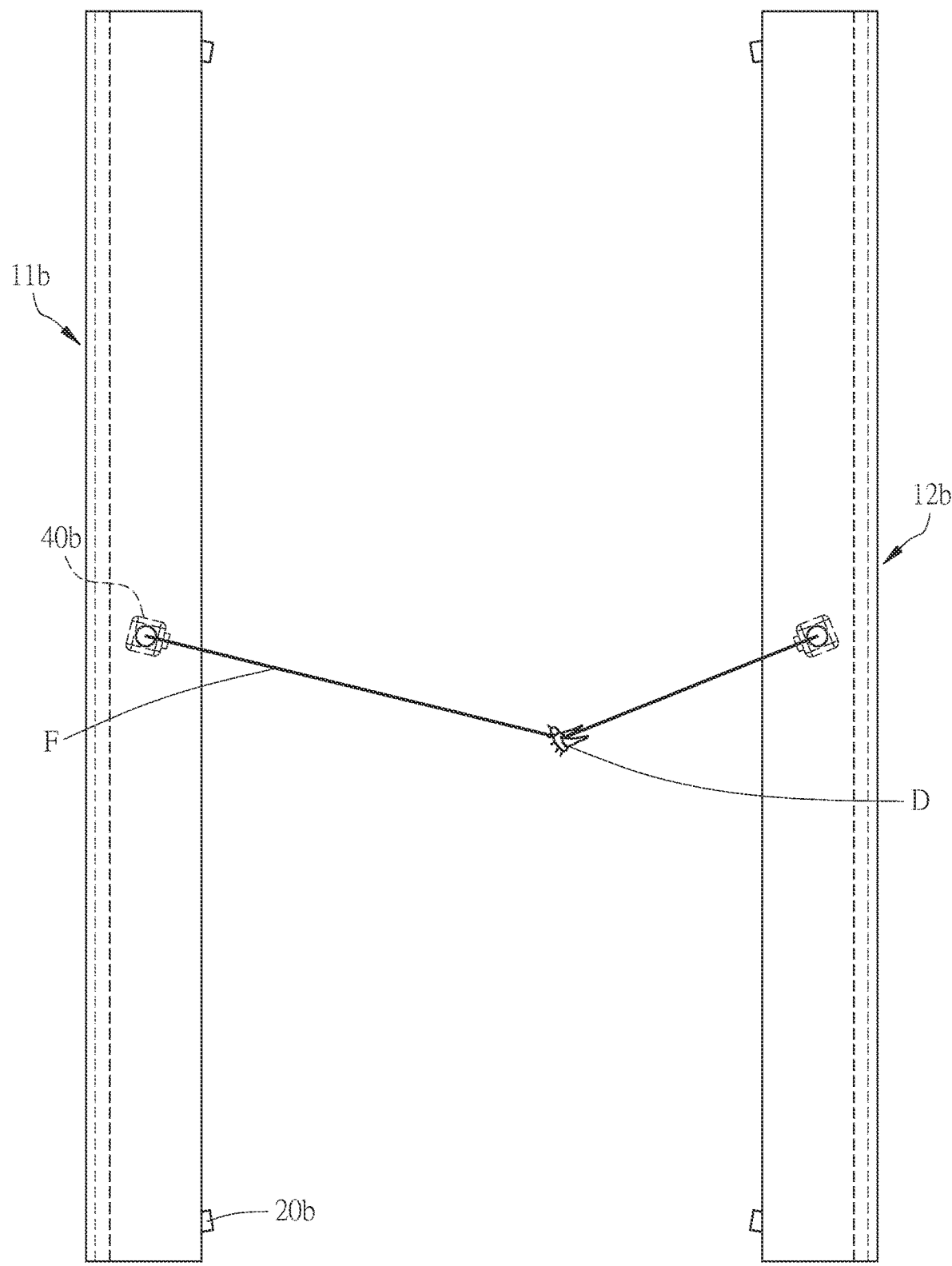
FIG. 15 is a first schematic view of the implementation of the third embodiment of the present invention, illustrating that the second light source is activated to eliminate the pest.

FIG. 14 and FIG. 15 illustrate a third embodiment of the optical pest repeller 100b of the present invention. The difference between the third embodiment and the second embodiment is that the second light source 40b and the first light sources 20b have different heights in the first direction A and are not arranged coaxially in the third embodiment.

Therefore, the number of the first light sources 20b needs to be increased. Seen from one side of the optical pest repeller 100b in the second direction B, there are four first light sources 20b. By calculating the situation where the first light ray (not shown) emitted by the four first light sources 20b is blocked, the coordinates of the pest D in the sensing range can be accurately calculated, and finally the pest D is eliminated by the second light source 40b.

In this embodiment, in order to increase the probability for the second light ray F to hit the pest D, two second light sources 40b are provided. The second light sources 40b are disposed on the first body 11b and the second body 12b, respectively.

Figure 16:
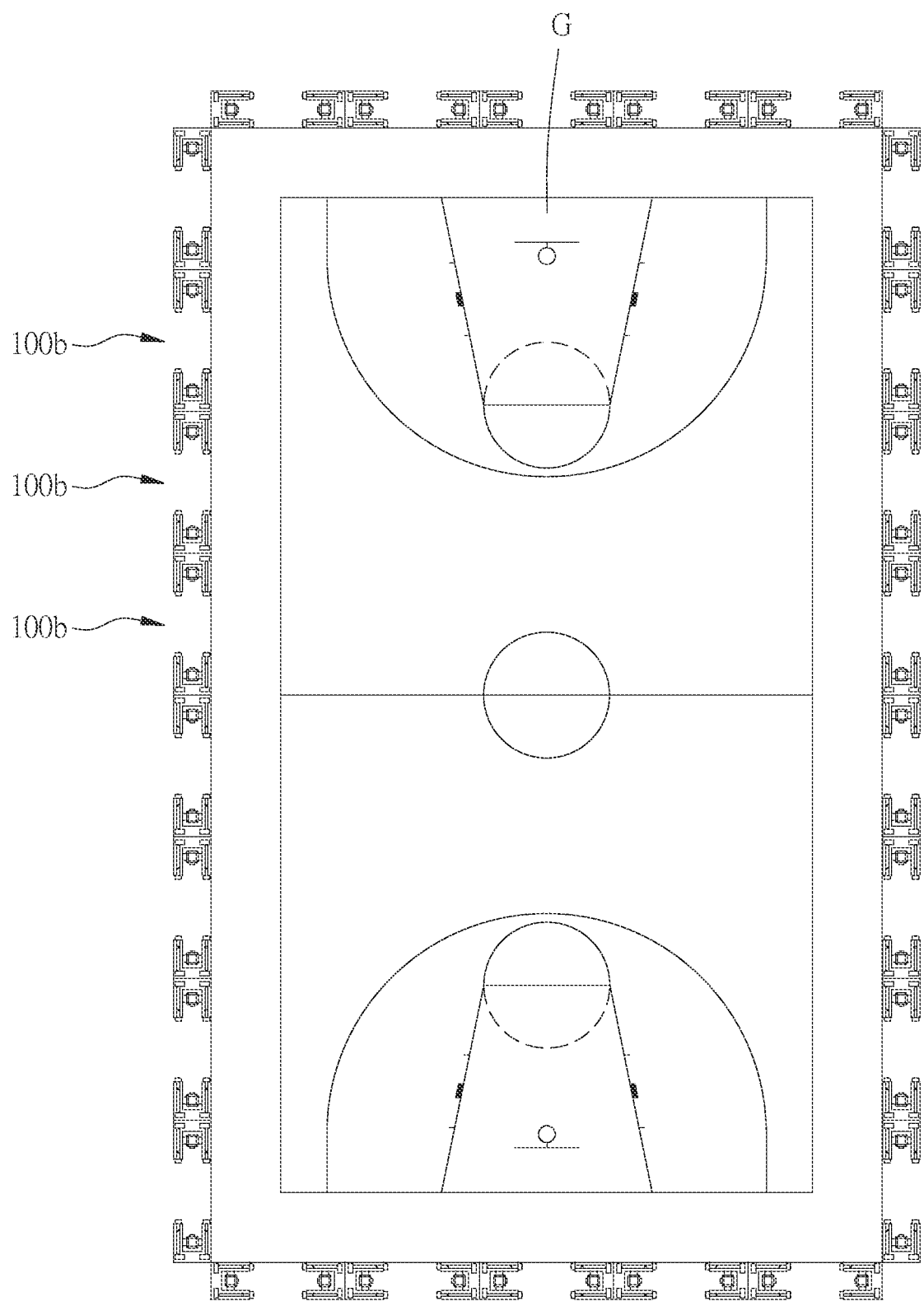
FIG. 16 is a second schematic view of the implementation of the third embodiment of the present invention, illustrating that the optical pest repeller is disposed in a ball field.

Referring to FIG. 15 and FIG. 16, in addition to applying the optical pest repeller 100b to an indoor door frame, the optical pest repeller 100b may be applied to an outdoor place, such as a ball field G.

When the optical pest repeller 100b is applied to the ball field G, a plurality of optical pest repellers 100b are arranged around the ball field G. Since the pest D usually flies close to the ground, as long as the flying height of the pest D is lower than the height of the optical pest repeller 100b, the pest D will only pass through the sensing range when entering or exiting the ball field G. This can increase the probability of eliminating the pest D greatly.

Figure 17:
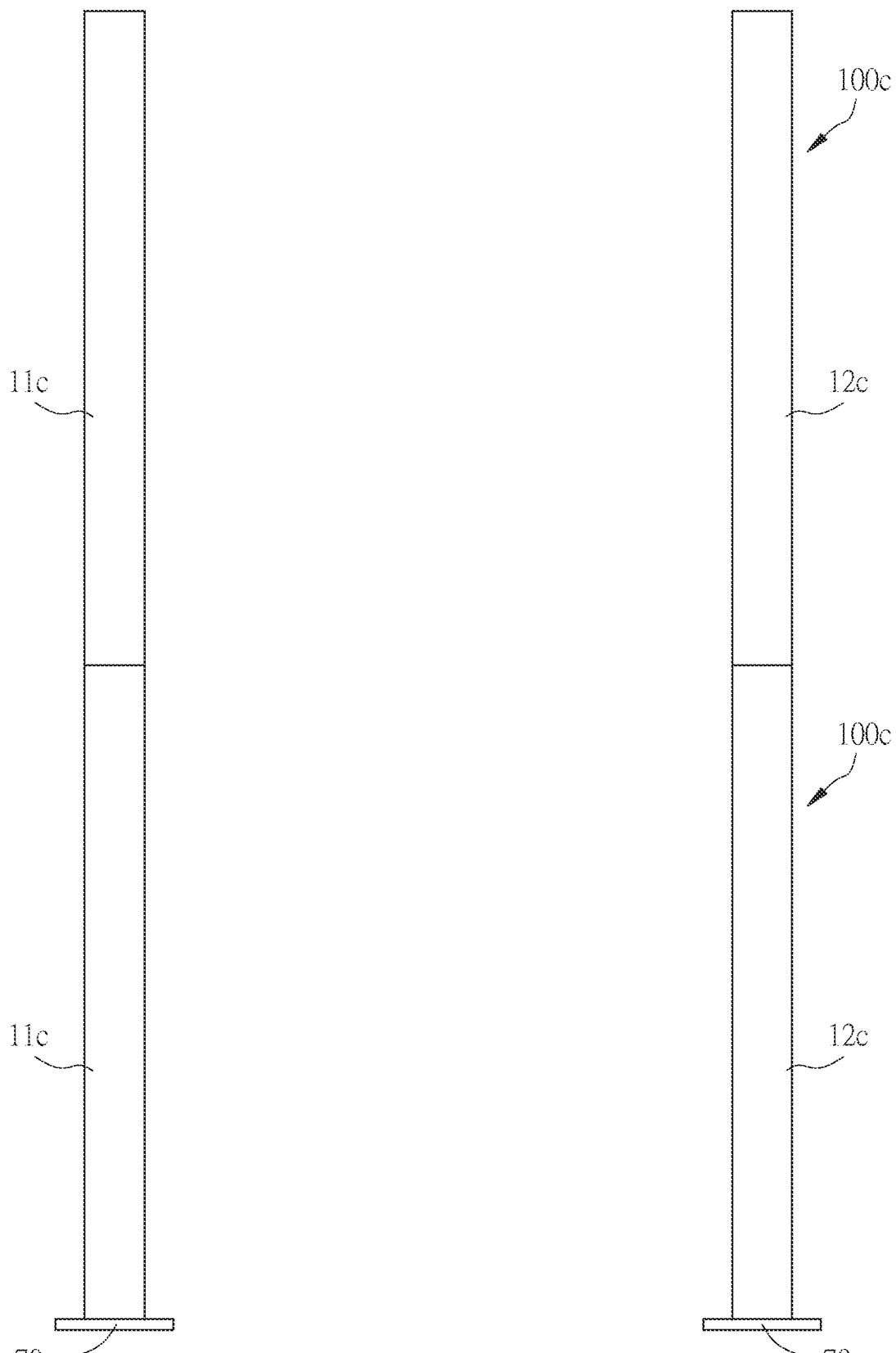
FIG. 17 is a front view according to a fourth embodiment of the present invention.

FIG. 17 illustrates a fourth embodiment of the optical pest repeller 100c of the present invention. When the optical pest repeller 100c is used outdoors, the bottom of each of the first body 11c and the second body 12c is provided with a base 70c, so as to ensure that the optical pest repeller 100c will not topple over.

In addition, when the height of the first body 11c and the second body 12c is insufficient, two sets of the first body 11c and the second body 12c of the optical pest repeller 100c (or may be regarded as the same set) are stacked one on top of another to increase the height.

Figure 18:
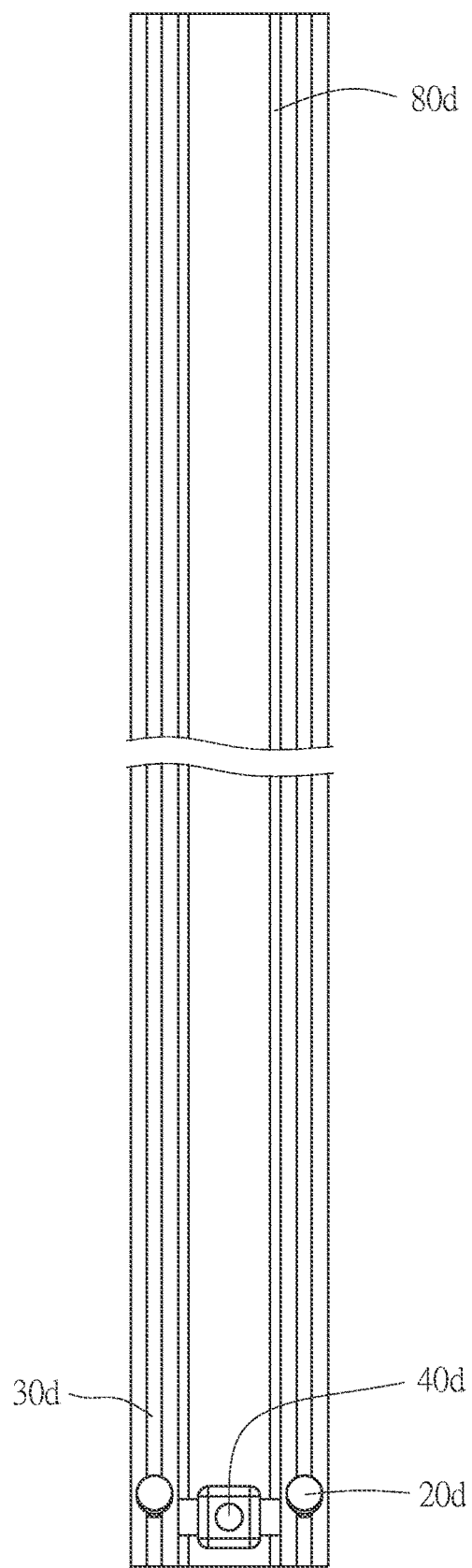
FIG. 18 is a side view according to a fifth embodiment of the present invention.
Figure 19:
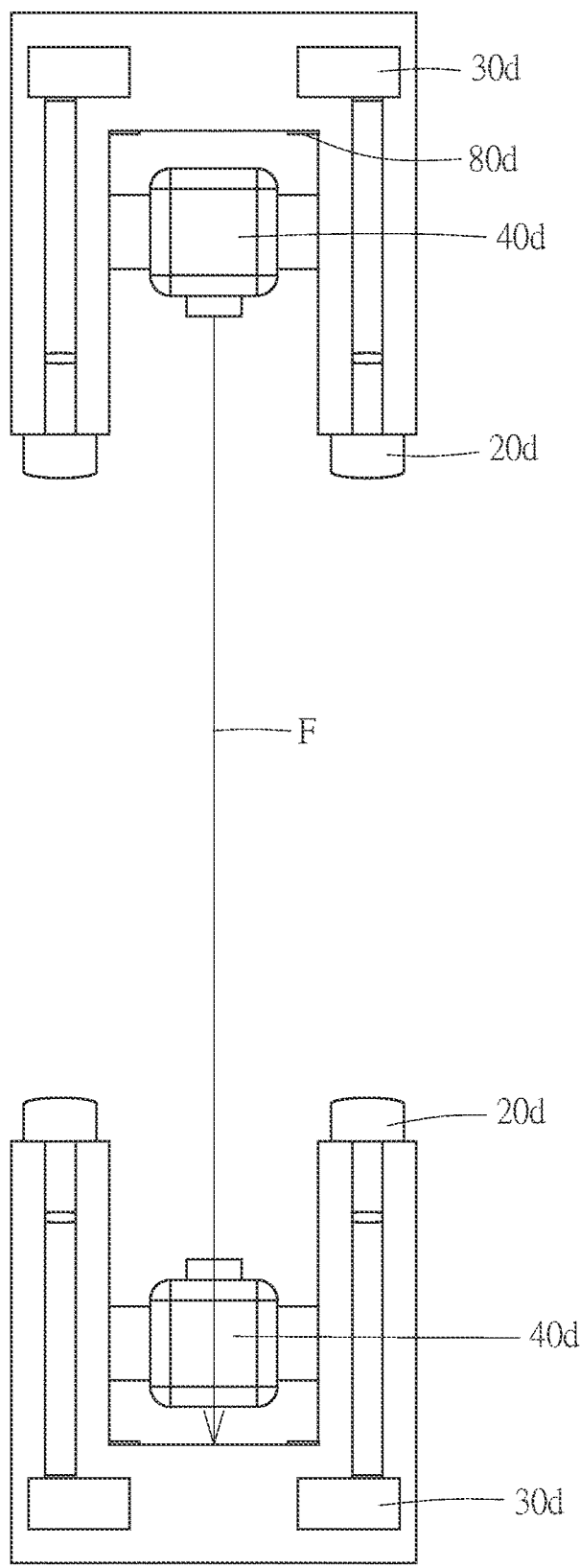
FIG. 19 is a first schematic view of the implementation of the fifth embodiment of the present invention, illustrating that the second light source is not skewed.
Figure 20:
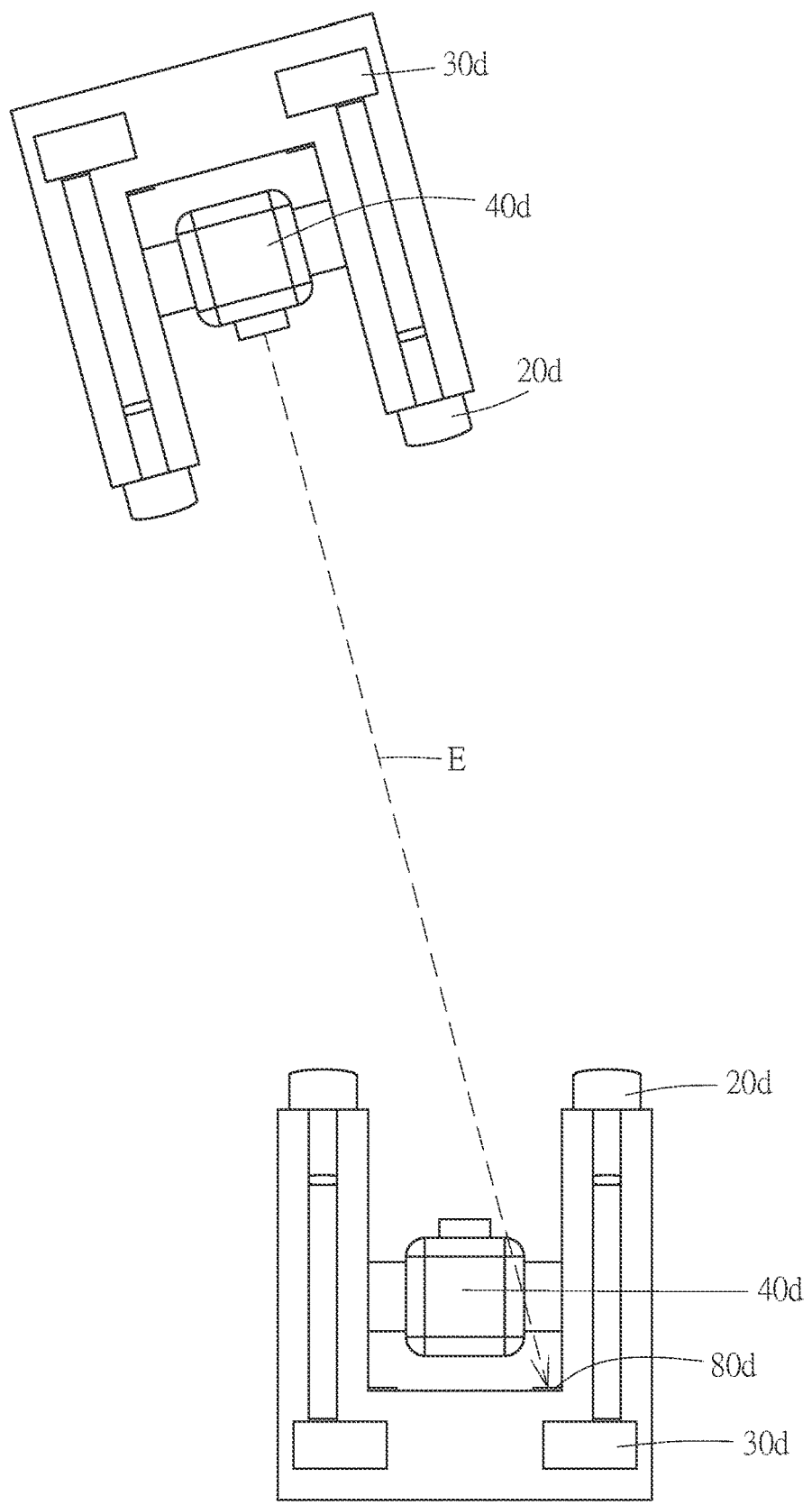
FIG. 20 is a second schematic view of the implementation of the fifth embodiment of the present invention, illustrating that the second light source is skewed.

FIGS. 18 to 20 illustrate a fifth embodiment of the optical pest repeller 100d of the present invention. The difference between the fifth embodiment and the first embodiment is that the fifth embodiment is provided with a plurality of second photosensitive members 80d.

The second photosensitive members 80d are located between the first photosensitive members 30d and surround the second light source 40d. The second photosensitive members 80d are in signal communication with the processing unit (not shown in this embodiment).

Since the energy density of the second light ray F is greater than the human body tolerance value, once the second light source 40d is not fixed and skewed, it may cause a danger. This embodiment is in cooperation with the second photosensitive members 80d. When the second light source 40d is skewed so only some of the second photosensitive members 80d receive the second light ray F, the processing unit will immediately control the second light source 40d to be turned off, thereby improving the safety of use. For example, when the second light source 40d does not focus the second light ray F, if all the second photosensitive members 80d receive the second light ray F, it means that the second light source 40d is not skewed; if only the second photosensitive member 80d at one side receives the second light ray F, it means that the second light source 40d is skewed. Or, when the second light source 40d focuses the second light ray F, only the second photosensitive member 80d at one side receives the second light ray F, which means that the second light source 40d is skewed. The second light ray F is simply shown in the figure.

Figure 21:
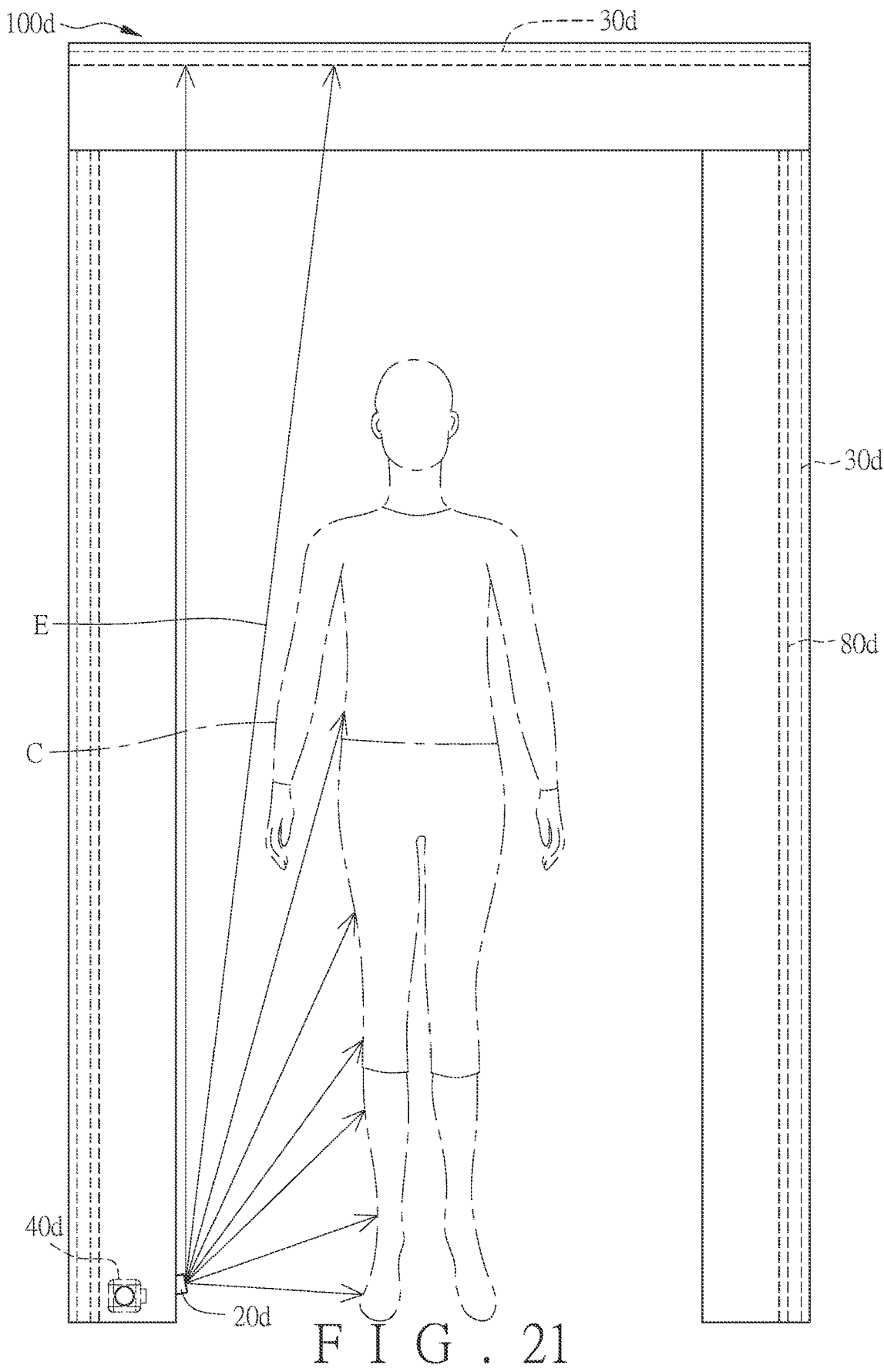
FIG. 21 is a third schematic view of the implementation of the fifth embodiment of the present invention, illustrating that the second light source stops working.
Figure 22:
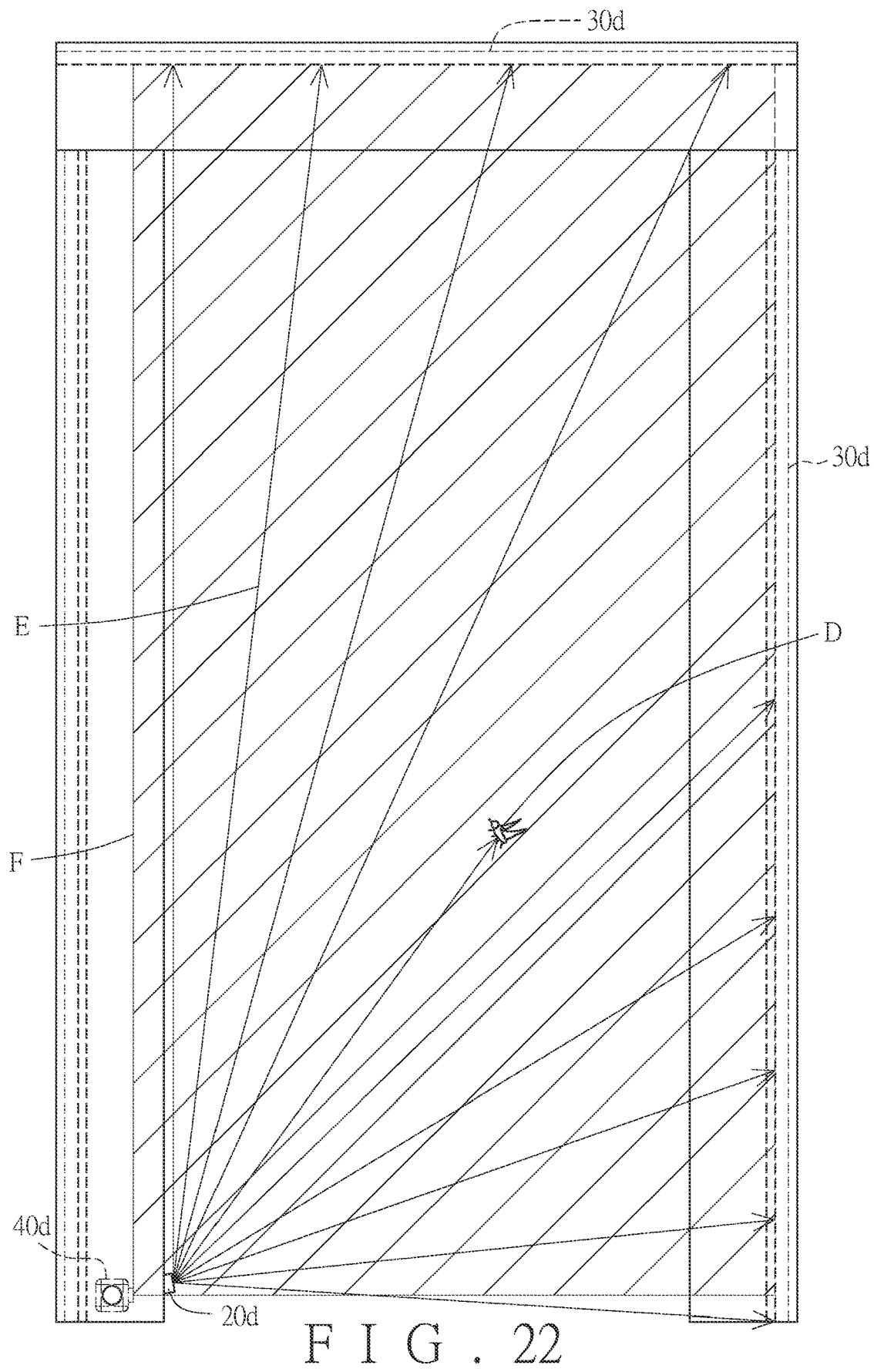
FIG. 22 is a fourth schematic view of the implementation of the fifth embodiment of the present invention, illustrating that the second light source is activated to eliminate the pest.

Referring to FIG. 21 and FIG. 22, in this embodiment, the second light source 40d is a planar light source. The second light source 40d keeps emitting the second light ray F, and stops emitting the second light ray F only when the light-shading area is not less than the threshold value or when only some of the second photosensitive members 80d receive the second light ray F. While improving the rate of killing the pest D, the danger caused by the skewing of the second light source 40d is avoided.

According to the different angle of divergence of the second light source 40d, the second photosensitive members 80d may be arranged in the form of two independent parallel lines as shown in FIG. 18, or may be arranged in the form of a closed rectangle or the like.

Please refer to FIG. 6 and FIG. 8 again. Taking the first embodiment as an example, in the optical pest repeller 100, the second light source 40 is arranged between the first photosensitive members 30 in the second direction B. Even if the second light source 40 is eliminating the pest D, once the human body C enters the sensing range by mistake, no matter from which side the human body C enters the sensing range, before the human body C is illuminated by the second light ray F, the second light source 40 is turned off in time. The safety of use of the optical pest repeller 100 is improved greatly.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. An optical pest repeller, comprising:
   at least two first light sources, jointly defining a sensing range between a first direction and a second direction, the first light sources being separated by a distance in the second direction, the first light sources each emitting a first light ray toward the sensing range, an energy density of the first light ray being not greater than a human body tolerance valve;
   at least two first photosensitive members, being disposed opposite to the first light sources and corresponding to the sensing range;
   at least one second light source, located between the first photosensitive members in the second direction, the second light source emitting a second light ray, an energy density of the second light ray being greater than the human body tolerance valve;
   a processing unit, being in signal communication with the first light sources, the first photosensitive members and the second light source;
   wherein when the first light ray emitted by the first light sources is blocked in a light-shading region in the sensing range, the processing unit obtains a position corresponding to the light-shading region and a light-shading area according to light-sensing conditions of the first photosensitive members;
   wherein when the light-shading area is less than a threshold value, the processing unit controls the second light source to emit the second light ray corresponding to the light-shading region according to the position of the light-shading region;
   wherein when the light-shading area is not less than the threshold value, the processing unit controls the second light source to stop emitting the second light ray.

2. An optical pest repeller, comprising:
   a first body extending along a first direction and a second direction, an included angle being defined between the first direction and the second direction;
   a second body, spaced apart from the first body, the first body and the second body jointly defining a sensing range between the first direction and the second direction;
   at least two first light sources, disposed on the first body and/or the second body, the first light sources being separated by a distance in the second direction, the first light sources each emitting a first light ray toward the sensing range, an energy density of the first light ray being not greater than a human body tolerance valve;
   at least two first photosensitive members, disposed on the first body and/or the second body, the first photosensitive members being opposite to the first light sources and corresponding to the sensing range;
   at least one second light source, disposed on the first body and/or the second body, the second light source being located between the first photosensitive members in the second direction, the second light source emitting a second light ray, an energy density of the second light ray being greater than the human body tolerance valve;
   a processing unit, being in signal communication with the first light sources, the first photosensitive members and the second light source;
   wherein when the first light ray emitted by the first light sources is blocked in a light-shading region in the sensing range, the processing unit obtains a position corresponding to the light-shading region and a light-shading area according to light-sensing conditions of the first photosensitive members;
   wherein when the light-shading area is less than a threshold value, the processing unit controls the second light source to emit the second light ray corresponding to the light-shading region according to the position of the light-shading region;
   wherein when the light-shading area is not less than the threshold value, the processing unit controls the second light source to stop emitting the second light ray.

3. The optical pest repeller as claimed in claim 2, further comprising a third body connected to the first body and the second body, the first body, the second body and the third body jointly defining the sensing range, the third body being also provided with the first photosensitive members.

4. The optical pest repeller as claimed in claim 2, further comprising a pivot unit connected with the second light source, the pivot unit including a motor and a rotating shaft, the processing unit being in signal communication with the motor, the rotating shaft being coupled to the second light source and a pivot hole of the first body and/or the second body, the processing unit controlling the pivot unit to drive the second light source to pivot relative to the first body and/or the second body to correspond to the light-shading region.

5. The optical pest repeller as claimed in claim 4, wherein the second light source is arranged coaxially with at least one of the first light sources.

6. The optical pest repeller as claimed in claim 2, further comprising at least one second photosensitive member disposed on the first body and/or the second body, the second photosensitive member being located between the first photosensitive members in the second direction and surrounding the second light source, the second photosensitive member being in signal communication with the processing unit; wherein when only part of the second photosensitive member receives the second light ray, the processing unit controls the second light source to stop emitting the second light ray.

7. The optical pest repeller as claimed in claim 2, wherein either end of the first body and/or the second body in the second direction is provided with two baffles and/or a groove, the first photosensitive members are correspondingly arranged between the adjacent baffles and/or in the groove.

8. The optical pest repeller as claimed in claim 2, further comprising a base coupled to a bottom of the first body and/or the second body in the first direction.

9. The optical pest repeller as claimed in claim 2, further comprising multiple sets of the first body and the second body, the multiple sets of the first body and the second body being combined with each other in a height direction.

10. The optical pest repeller as claimed in claim 2, wherein when the second light source is a point light source, the second light source emits the second light ray only when the light-shading area is less than the threshold value; when the second light source is a planar light source, the second light source keeps emitting the second light ray, and stops emitting the second light ray only when the light-shading area is not less than the threshold value.

* * * * *